United States Patent
Khojastepour (10) Patent No.: US 8,284,855 B2
(45) Date of Patent: Oct. 9, 2012

(54) MULTI-USER DOWNLINK LINEAR MIMO PRECODING SYSTEM

(75) Inventor: Mohammad A. Khojastepour, Lawrenceville, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/273,880

(22) Filed: Oct. 14, 2011

(65) Prior Publication Data

US 2012/0033756 A1 Feb. 9, 2012

Related U.S. Application Data (62) Division of application No. 12/002,874, filed on Dec. 19, 2007, now Pat. No. 8,059,733.

(60) Provisional application No. 60/870,930, filed on Dec. 20, 2006.

(51) Int. Cl.
*H04B 7/02* (2006.01)

(52) U.S. Cl. ........ 375/267; 375/260; 375/299; 375/347; 455/101; 455/132; 455/500; 455/562.1; 370/236; 370/329; 370/334; 370/343; 370/344; 370/464; 370/480; 341/173; 341/180

(58) Field of Classification Search .......... 375/260, 375/267, 299, 347; 455/101, 132, 500, 562.1; 370/236, 329, 334, 343, 344, 464, 480; 341/173, 341/180

See application file for complete search history.

(56) References Cited

U.S. PATENT DOCUMENTS

| | | | |
|---|---|---|---|
| 7,515,878 B2 * | 4/2009 | Zhang et al. | 455/69 |
| 7,630,337 B2 * | 12/2009 | Zheng et al. | 370/329 |
| 7,702,029 B2 * | 4/2010 | Kotecha et al. | 375/267 |
| 8,023,457 B2 * | 9/2011 | Kotecha et al. | 370/329 |
| 2007/0280116 A1 * | 12/2007 | Wang et al. | 370/236 |

* cited by examiner

*Primary Examiner* — Leon Flores
(74) *Attorney, Agent, or Firm* — Joseph Kolodka; Akitaka Kimura (57) ABSTRACT

Multi-user (MU-) MIMO systems with quantized feedback are designed to maximize the sum-rate via scheduling and linear precoding. To maximize throughput over the network, quantized CSIT is sent through a low-rate feedback link feedback from a plurality of users back to a base station. The base station then determines a subset of the plurality of users to transmit one or more signals to based on the received feedback and determines a precoding matrix based on the received feedback from the plurality of users wherein the precoding matrix maximizes a sum-rate throughput for the subset of the plurality of users. Additionally, based on the received feedback, the base station designs a quantization codebook. This codebook may be designed off-line and/or online. The codebook and/or precoding matrix are used to transmit signals to the users.

3 Claims, 5 Drawing Sheets

MULTI-USER DOWNLINK LINEAR MIMO PRECODING SYSTEM

This application is a divisional of U.S. patent application Ser. No. 12/002,874, filed Dec. 19, 2007, which in turn claims priority to U.S. Provisional Patent Application No. 60/870,930, filed Dec. 20, 2006, which is incorporated by reference herein.

BACKGROUND OF THE INVENTION

The present invention is related generally to wireless transmission, and in particular, to throughput optimization of multi-user downlink linear multi-input multi-output (MIMO) precoding systems with quantized feedback.

In MIMO wireless transmission systems, higher rates of throughput (e.g., sum rates) for the overall system are desired. To facilitate gains in throughput, precoding may be used. Precoding is a generalized beamforming scheme for supporting multi-layer transmission in MIMO systems. In precoding, the multiple streams of the signals are emitted from the transmit antennas with independent and appropriate weighting so as to increase the link throughput at the receiver output.

In current systems, precoding algorithms for multi-user MIMO use either linear or nonlinear precoding algorithms. Linear precoding may achieve reasonable performance with lower complexity than nonlinear precoding. Nonlinear precoding may achieve greater capacity, but is very complex and accordingly slower. In general, nonlinear precoding is designed based on the concept of dirty paper coding (DPC). That is, known interference at the transmitter is subtracted without the penalty of resources if the optimal precoding scheme is applied to the transmission signal.

In general, multi user (MU-) MIMO systems offer significant gains over single user (SU-) MIMO schemes. In particular, by increasing the number of users there is a potential gain in system throughput. Even for a relatively small number of users, MU-MIMO systems can still outperform SU-MIMO systems by using an appropriate transmission scheme (such as precoding) for low- and mid-range SNRs.

With full channel state information at the transmitter (CSIT), the capacity of a Gaussian MU-MIMO channel is achieved by using DPC. However, there are insufficient solutions regarding capacity without CSIT or with partial CSIT. Many prior systems have instead used simpler transmission schemes with linear precoding. With partial CSIT, different schemes have been used. For example, a simple random beamforming algorithm has been used to realize the asymptotical gain of scheduling at the limit of large number of users. In another example, a robust opportunistic user scheduling and power allocation strategy based on limited feedback is used. However, these systems have sub-optimal throughput over the network because they do not have full CSIT and cannot quickly and efficiently schedule multiple users.

Therefore, there remains a need to improve throughput in MU-MIMO networks using CSIT.

BRIEF SUMMARY OF THE INVENTION

The present invention is generally directed to transmission in downlink multi-user MIMO networks. To maximize throughput over the network, quantized CSIT is sent through a low-rate feedback link feedback from a plurality of users back to a base station. The base station then determines a subset of the plurality of users to transmit one or more signals to based on the received feedback and determines a precoding matrix based on the received feedback from the plurality of users wherein the precoding matrix maximizes a sum-rate throughput for the subset of the plurality of users.

Additionally, based on the received feedback, the base station designs a quantization codebook. This codebook may be designed off-line and/or online. The codebook and/or precoding matrix are used to transmit signals to the users.

These and other advantages of the invention will be apparent to those of ordinary skill in the art by reference to the following detailed description and the accompanying drawings.

DETAILED DESCRIPTION

The present invention is related generally to downlink wireless networks, and in particular to throughput optimization in multi-user downlink linear multi-input multi-output (MIMO) precoding systems with quantized feedback. In general, multi-user MIMO (MU-MIMO) systems may offer significant gains over single user MIMO (SU-MIMO) schemes. In particular, by increasing the number of users (e.g., receivers) there is a potential gain in transmission scheduling. Even for a relatively small number of users, MU-MIMO systems may still outperform SU-MIMO systems by using an appropriate transmission scheme, such as precoding, for the low- and mid-range signal to noise ratios (SNRs).

To improve scheduling, linear precoding may be used in MU-MIMO systems where the quantized channel state information at the transmitter (CSIT) is provided through a low-rate feedback link. With full CSIT, the capacity of a Gaussian MU-MIMO channel may be achieved by using dirty-paper coding. Thus, in a linear precoder design—given quantized CSIT—the actual channels lie in a "neighborhood" of the quantized channel with certain distribution. Since the precoding is based on a specific quantization codebook, the performance of MU-MIMO schemes with quantized feedback using the inventive linear precoder design is directly affected by the quantization codebook. Similarly, a quantization codebook may be designed based on a capacity measure for general correlated channels. A new distance metric on the Grassmanian manifold is used to design the optimal precoder codebook. In application, this new metric is equivalent to the chordal distance at low SNRs and to the Fubini-Study distance at high SNRs. Thus, codebooks based on the inventive distance metric outperform codebooks designed based on chordal distance and Fubini-Study distance.

Further, transmissions to multiple users (e.g., receivers, reception antennas, etc.) may be scheduled to maximize throughput in wireless networks. The scheduling uses the quantized feedback from the users to create a precoder and/or a codebook for use in signal transmission.

Figure 1:
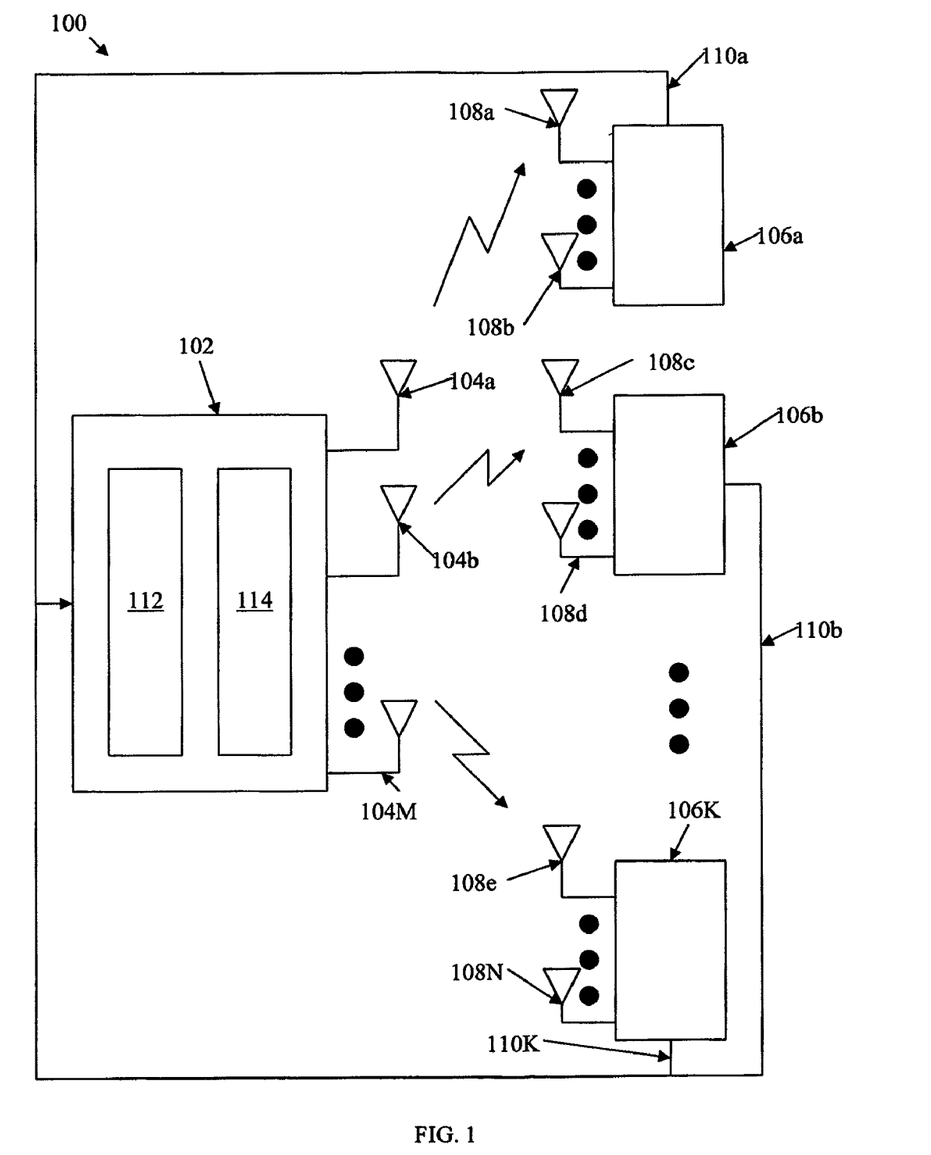
FIG. 1 depicts an exemplary network in which the present invention may be implemented.

FIG. 1 depicts an exemplary network 100. Network 100 includes a base station 102 which has one or more (e.g., 1, 2, ..., M) transmission antennas 104a, 104b, ..., 104M. The base station 102 may transmit signals via transmission antennas 104a-104M to one or more (e.g., 1, 2, ..., K) receivers 106a, 106b, ..., 106K which may each have one or more reception antennas 108a, 108b, 108c, 108d, 108e, ..., 108N. Each of the receivers 106a-106K may be capable of transmitting feedback via respective feedback links 110a, 110b, ..., 110K.

Network 100 may be a downlink multi-user multiple input and multiple output (MU-MIMO) system. That is, network 100 may include multiple base stations 102 and/or multiple receivers 106a-106K and base stations 102 may transmit signals to the receivers 106a-106K.

Base station 102 may have and/or be a wireless transmitter (e.g., cellular site, satellite, Tx, etc.) as is known and accordingly may include a precoder 112 for precoding signals transmitted by transmission antennas 104a-104M and/or a scheduler 114 for scheduling one or more transmissions. In some embodiments, base station 102 may comprise multiple transmitters, each with multiple precoders 112 and transmission antennas 104a-104M. Further, base station 102 may comprise one or more reception antennas and/or inputs (not shown) for receiving input data and/or feedback signals, etc. and one or more controllers (e.g., controller 500 of FIG. 5) and/or or appropriate control circuitry, symbol generators, multiplexers, etc.

Receivers (e.g., users) 106a-106K may be wireless reception devices (e.g. mobile telephone, ground station, Rx, etc.) as are known and may be capable of receiving and decoding (e.g., demultiplexing) signals received at reception antennas 108a-108N as well as transmitting feedback (e.g., quantized feedback) to base station 100. It is understood that this feedback transmission may be wired and/or wireless over feedback links 110a-110K and/or may be transmitted using a combination of reception antennas 108a-108N (e.g., to transmit) and/or transmission antennas 104a-104M (e.g., to receive) and feedback links 110a-110K are shown in this manner for diagram simplicity. Feedback links 110a-110K may be low-rate feedback links providing channel state information to the transmitter. In this way, the transmitter may have (e.g., may determine from information received over feedback links 110a-110K) CSIT.

Figure 5:
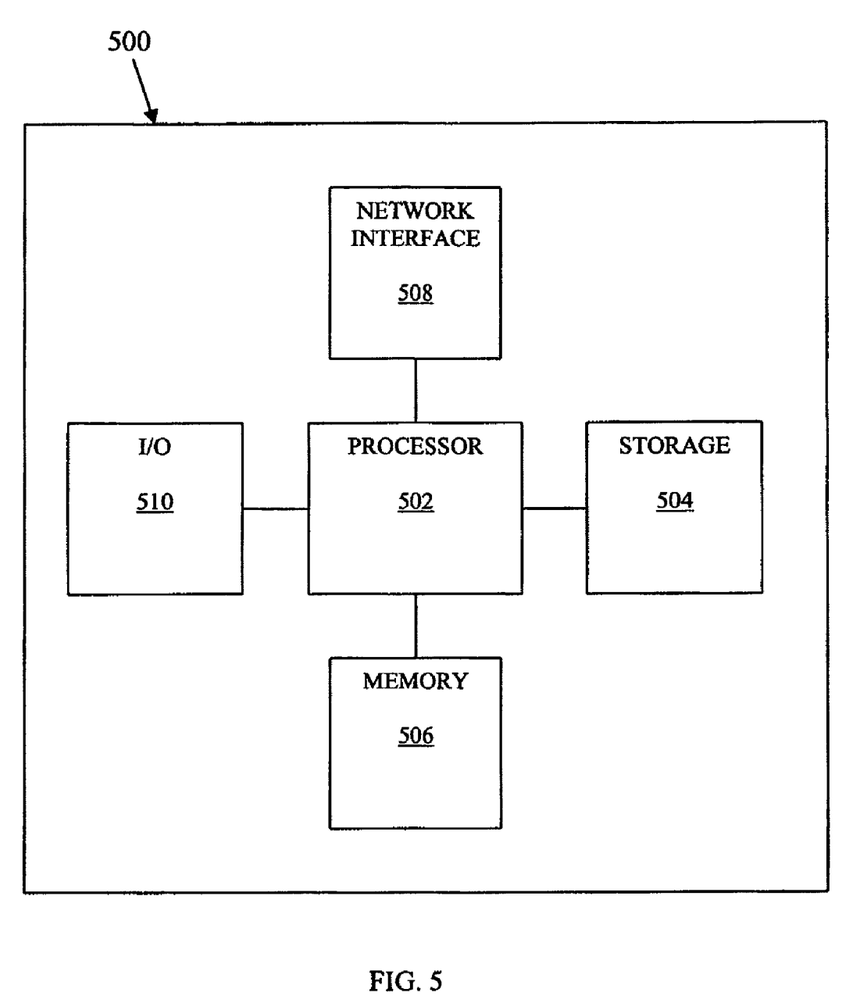
FIG. 5 is a schematic drawing of a controller.

Precoder 112 and/or controller 500 may be capable of performing precoding functions. That is, the precoder 112 and/or controller may design, determine, and/or implement a precoder and/or a codebook for use in signal transmission by base station 102.

In network 100, the complex baseband signal model for the $k^{th}$ receiver (e.g., of receivers 106a-106K) is $y_k = H_k x + w_k$ where x is the M×1 transmitted signal vector, $H_k$ is the $N_k \times M$ channel matrix, $w_k \sim N_c(0, I)$ is a circularly symmetric complex additive white Gaussian noise vector, and $y_k$ is the $N_k \times 1$ received signal vector. In a block fading channel model in which the channel remains constant during the transmission of each packet (or codeword of length T) and the channel changes independently from one block to another, where the distribution of the channel state is known a priori, the average power constraint is given by $E[x^H x] \leq P$.

For maximizing the sum-rate (e.g., the total rates from the base station 102 to active receivers 106a-106K) throughput in network 100, the following assumptions are made. First, quantized channel state information for each receiver 106a-106K is provided via a feedback link 110a-110K. Second, only linear precoding is allowed by the base station 102. Third, receivers 106a-106K do not decode other receivers' signals; they treat those signals as noise.

Figure 2:
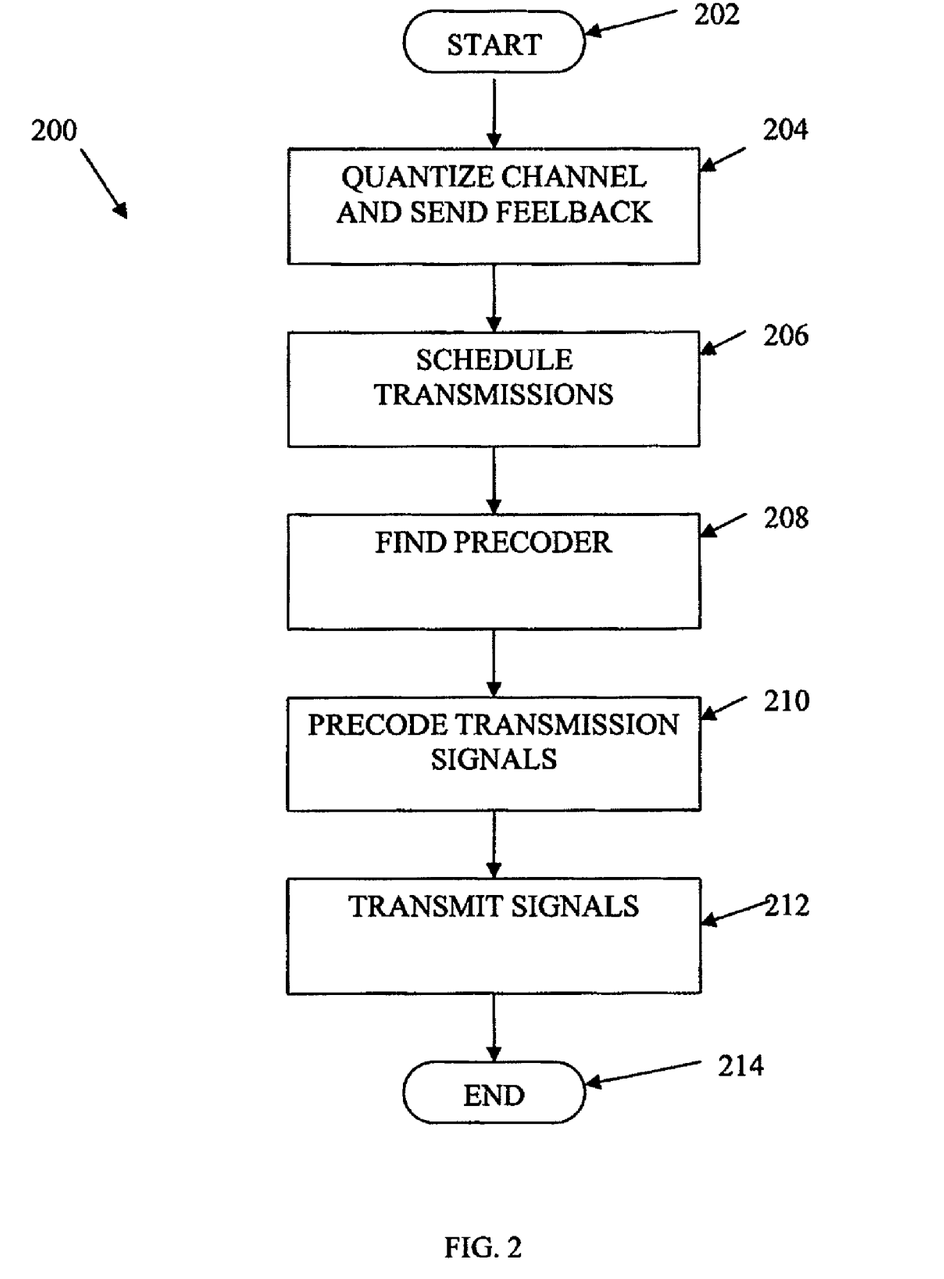
FIG. 2 depicts a flowchart of a method of transmission over a network.

FIG. 2 depicts a flowchart of a method 200 of transmission over the network 100. In at least one embodiment, transmission may be transmission of signals (e.g., wireless signals, information, data, etc.) from base station 102 to receivers 106a-106K. The method 200 begins at step 202.

In step 204, a channel is quantized and feedback is sent from receivers 106a-106k to base station 102 over feedback links 110a-110K. In at least one embodiment, the channel being quantized may be indicative of a channel received from the base station 102 and information indicative of the channel may be quantized by receivers 106a-106K and/or base station 102. The quantized channels may then be fed back as feedback to the base station 102 via feedback links 110a-110K.

Figure 3:
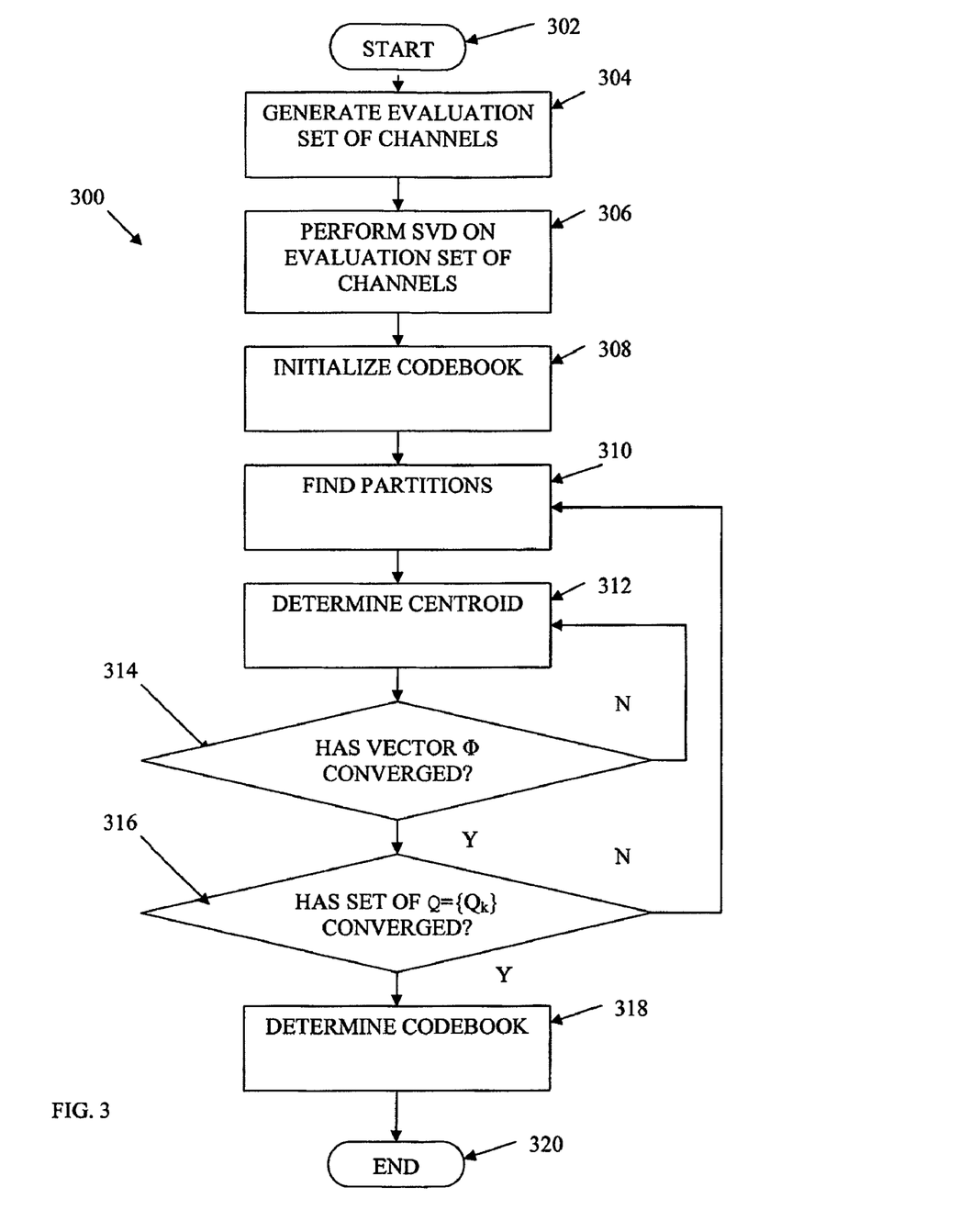
FIG. 3 depicts a flowchart of a method of designing a quantization codebook according to an embodiment of the invention.

For quantization of a channel, let $U_k D_k V_k^*$ be a singular value decomposition (SVD) of the $k^{th}$ receiver channel $H_k$. With B bits of feedback per receiver, the receivers 106a-106K quantize the first N columns of $V_k$ (where $N \leq \min(N_1, \ldots, N_k, M)$ is a fixed number predetermined by the base station 102) using a quantization codebook $Q = \{Q_1, Q_2, \ldots, Q_{2^B}\}$, $Q_i \in \mathbb{C}^{M \times N}$ as $$\hat{V}_k(1:N) = \underset{Q \in Q}{\operatorname{argmin}} d(V_k(1:N), Q),$$

where $d(.,.)$ is a distance metric. The columns of the quantized precoding matrix $\hat{V}_k(1:N)$ correspond to possible different streams for a particular receiver 106a-106K. Codebook design and choice of an appropriate distance metric are discussed in further detail below with respect to method 300.

In step 206, transmissions are scheduled. That is, at a given time, a determination may be made as to which receivers 106a-106K should receive transmissions. In some embodiments, based on the quantized feedback sent from the receivers 106a-106K to the base station 102 in step 204, the base station 102 selects a subset of L, $L \leq M$, streams (u) to transmit over transmission antennas 104a-104M.

In system 100 with K receivers 106a-106K where each receiver 106a-106K feeds back quantized channel state information (CSI) corresponding to the first N dominant eigenvectors $V_k(1:N)$ of its channel $H_k$, scheduling comprises choosing a set of L streams out of KN possible streams that have the best throughput performance. Thus, the optimum receiver subset selection requires calculating the performance for $$\binom{KN}{L}$$

subsets and the computational complexity of finding the optimal precoder with maximum throughput for each subset is high. Hence, optimal scheduling is computationally intensive.

In some embodiments, an alternative scheduling criterion may be used. In such embodiments, the scheduler 114 or another component (e.g., base station 102, controller 500 of FIG. 5, etc.) determines the subset of receivers 106a-106K that minimizes $$\phi(\hat{V}) = \sum_{i=1}^{L} \sum_{j=1, j \neq i}^{L} |\hat{v}_i^* \hat{v}_j|^2$$

for all matrices $\hat{V} = [\hat{v}_1, \hat{v}_2, \ldots, \hat{v}_L]^T$ composed of L out of KN quantized eigenvectors. To solve this scheduling problem, a numerical approach based on simulated annealing may be used where different subsets of quantized eigenvectors constitute the set of states and the energy of the state $\hat{\underline{V}}$ is given by $\phi(\hat{\underline{V}})$. In the $i^{th}$ iteration, the transition probability between the current state $\hat{\underline{V}}^{(i)}$ and the candidate state $\hat{\underline{V}}^{(i+1)}$ is given by $$P(\hat{\underline{V}}^{(i)} \to \hat{\underline{V}}^{(i+1)}) = \min\left(1, \exp\left[\frac{1}{T_i}(\phi(\hat{\underline{V}}^{(i)}) - \phi(\hat{\underline{V}}^{(i+1)}))\right]\right)$$

where $T_i$ is a sequence of decreasing positive real numbers.

In step 208, a precoder (e.g., a precoding matrix) is found. The precoder may be found as described below with respect to method 400 and FIG. 4.

At step 210, the signals to be transmitted from base station 102 are precoded. Here, a quantization codebook may be designed (as described below with respect to FIG. 3 and method 300) and/or a predetermined codebook may be used (e.g., selected, via a look-up, using controller 500, etc.).

A transmitted signal x from the base station 102 may comprise L data streams, $u_1, u_2, \ldots, u_L$, sent through column vectors $g_1, g_2, \ldots, g_L$ of a linear precoder G (e.g., precoder 112). In this way, $$x = Gu = \sum_{i=1}^{L} u_i g_i$$

where one or more streams may be intended for a receiver 106a-106K.

In some embodiments, steps 204-210 are performed jointly (e.g., in parallel) to find the optimal transmission scheme. In alternative embodiments, a decoupled (e.g., step by step) approach may be used where the quantization codebook design depends only on maximizing a single-receiver capacity, the scheduling is based on minimizing the sum of the inner products between the channel directions of all pairs of the scheduled receiver streams, and the optimal linear precoder is designed for the scheduled subset of the receiver streams based on maximizing the sum rate.

Following precoding in step 210, the signals are transmitted by base station 102 to one or more of receivers 106a-106K in step 212. The method ends at step 214.

FIG. 3 depicts a flowchart of a method 300 of designing a quantization codebook according to an embodiment of the invention. A quantization codebook may be designed using a criterion based on a capacity measure. This differs from conventional codebook design (e.g., using the maximum mutual-minimum-distance). Thus, optimal codebook design may be based on the capacity measure, which is generally SNR dependant. While the capacity measurement does not directly define a valid distance metric for the design, a simple bound on the capacity expression can be used to formulate a quantization codebook design.

Since codebook design is independent of a receiver's index, for notational simplicity the subscript "k" will not always be used hereinafter. For example, the channel matrix of the $k^{th}$ receiver would be noted H. With B bits of feedback, designing a codebook may comprise finding the set $Q=\{Q_1, Q_2, \ldots, Q_{2^B}\}$ of semi-unitary matrices and mapping Q(H) from the set of channel conditions H to Q that maximizes the instantaneous information rate $$C = \text{logdet}\left(I + \frac{P}{N} HQ(H)Q(H)^*H^*\right)$$

where Q(H) represents the M×N transmission matrix used for the channel condition H and Q(H)*Q(H)=I.

The method starts at step 302. In step 304, an evaluation set of channels (e.g., $\{H^{(l)}\}_{l=1}^{Size}$) is generated. In at least one embodiment, the evaluation set may be based on channel distributions. In step 306, the evaluation set is factorized. That is, the evaluation set of channels from step 304 are singular value decomposed (e.g., $H^{(l)}=U^{(l)}D^{(l)}V^{(l)}$).

For further notational simplicity, Q(H) is represented only as Q hereinafter. Substituting the SVD of H=UDV* into $$C = \text{logdet}\left(I + \frac{P}{N} HQ(H)Q(H)^*H^*\right), C = \text{logdet}\left(I + \frac{P}{N}|D|^2 V^*QQV^*\right)$$

An approximate upper bound of the capacity may be expressed, where channel realizations have bounded norms (e.g., $\|H\|_F^2 = \text{tr}[H^*H] = \text{tr}[D^2] \leq \beta$), as $$C \lessapprox \text{logdet}\left(I + \frac{P}{N}\beta V^*QQV^*\right).$$

Considering the low SNR approximation (e.g., P→0), $$C \lessapprox \frac{P\beta}{N}\|V^*Q\|_F^2.$$

Similarly, considering the high SNR approximation (e.g., P→∞), $$C \lessapprox \log\left(\frac{P\beta}{N}|V^*Q|^2\right).$$

For 0<SNR<∞, since the transmitted signals are the linear combination of the columns of the precoder Q, the quantization codebook design relies on a metric that measures the distance between the subspaces spanned by different precoders (e.g., $Q_1$ and $Q_2$). Maximizing $$C \lessapprox \text{logdet}\left(I + \frac{P}{N}\beta V^*QQV^*\right)$$

is related to minimizing the p-metric $$d_p(Q, V) = \arccos\left[\frac{\left(I + \frac{P}{N}\beta V^*QQV^*\right)}{(1+p)^N}\right]$$

between the subspaces defined by V and Q on the Grassmanian manifold G(M,N) (e.g., the space of all N dimensional subspaces of an M dimensional vector space). The design of a codebook as discussed herein is based on the p-metric and accordingly depends on the SNR level. Therefore, based on the average power P, the value of the parameter p is chosen as $$p = \frac{\beta P}{N}$$

where the resulting codebook is found where SNR varies in a neighborhood of the design SNR. The choice of $\beta$ is discussed in further detail below. Of course, it follows that $$p = \frac{SNR_{ave}}{N} \max_k \left\{ \|H^{(l)}\|_F^2 \right\} \text{ and } d_p(Q, V) = \arccos\left[\frac{\det(I + pV^*QQ^*V)}{(1+p)^N}\right]$$

(e.g., the inventive distance metric).

In step 308, the codebook $Q(0) = \{Q_1(0), Q_2(0), \ldots, Q_{2^B}(0)\}$ is initialized. In at least one embodiment, the codebook is initialized randomly. In step 310, partitions $\{\mathcal{V}_k, k=1, 2, \ldots, 2^B\}$ are found where $\mathcal{V}_k$ is the set of all right singular vectors defined in the partitioning discussed below.

Given the quantization codebook $Q = \{Q_1, Q_2, \ldots, Q_{2^B}\}$, the optimal partitioning of the quantizer $Q(H)$ satisfies:

$$\mathcal{V}_k = \{V \in \mathbb{C}^{M \times N} : d_p(V, Q_k) \leq d_p(V, Q_j), \forall j \neq k\}.$$

In step 312, the centroid is found. In at least one embodiment, the centroid may be expressed as $\{Q_k(i), k=1, 2, \ldots, 2^B\}$. To satisfy the centroid condition, $$Q_k = \arg \min_{Q \in \mathbb{C}^{M \times N}, Q^*Q=I} E[d_p(Q, V) | V \in V_k]$$

may be solved for the $k^{th}$ partition. In at least one embodiment, this may be solved numerically. To employ a gradient-descent search algorithm, real representations of the matrices Q, H, V, are used as $\overline{Q}, \overline{H}, \overline{V}$, respectively, defined by $$\overline{Q} = \begin{bmatrix} \Re e(Q) & -\Im m(Q) \\ \Im m(Q) & \Re e(Q) \end{bmatrix}.$$

The semi-unitary matrix $Q \in \mathbb{C}^{M \times N}$ is then parameterized using $N_\phi = 2(M-N+1)N$ independent real parameters $\phi_l$, $l=1, \ldots, N_\phi$. Therefore, $$Q_k = \arg \min_{Q \in \mathbb{C}^{M \times N}, Q^*Q=I} E[d_p(Q, V) | V \in V_k]$$

may be determined by considering the unconditional problem in terms of the vector $\phi = [\phi_1, \phi_2, \ldots, \phi_{N\phi}]$. This leads to the objective function $$\min_\Phi J(Q(\Phi)) = \min_\Phi E[d_p(\overline{Q}(\Phi), \overline{V} | V \in \mathcal{U}_k].$$

The derivative of this objective function with respect to $\phi_k$ is then $$\frac{\partial}{\partial \phi_k} J(\overline{Q}(\Phi)) = tr\left\{ \left[\frac{\partial \overline{Q}(\Phi)}{\partial \phi_k}\right]^T \nabla_{\overline{Q}} J(\overline{Q}) \right\}, 1 \leq k \leq N_\Phi$$

where $$\nabla_{\overline{Q}} J(\overline{Q}) = E\left[-\frac{(1-F^2)^{-1/2}}{(1+p)^N} \nabla_{\overline{Q}} \det(I + p\overline{V}^T \overline{QQ}^T \overline{V}) \bigg| V \in \mathcal{U}_k\right]$$

$$= \nabla_{\overline{Q}} J(\overline{Q})$$

$$= E\left[-2pF(1-F^2)^{-1/2} \overline{V}\overline{V}^T \overline{Q}(I + p\overline{V}^T \overline{QQ}^T \overline{V})^{-1} | V \in V_k\right]$$

with $$F = \left[\frac{\det(I + p\overline{V}^T \overline{QQ}^T \overline{V})}{(1+p)^N}\right].$$

Therefore, a gradient descent search algorithm may be used with the recursion $\Phi^{(l+1)} = \Phi^{(l)} - \mu_l \nabla_\Phi J(\overline{Q}(\Phi))|_{\Phi^{(l)}}$ where $\mu_l$ is the sequence of step sizes.

In step 314, a check is performed to determine if the centroid $\Phi_{(l+1)} = \Phi^{(l)} - \mu_l \nabla_\Phi J(\overline{Q}(\Phi))|_{\Phi^{(l)}}$ has converged. Here, $\phi$ is used to find the unitary matrix $Q(\phi)$ and $Q(\phi)$ is the centroid for $\mathcal{V}_k$ described above. If the centroid has not converged, step 312 is repeated iteratively until convergence.

If the centroid has converged, the method proceeds to step 316 and a check is performed to determine if the quantization codebook $\mathcal{Q} = \{Q_k\}$ has converged. If the codebook has converged, the method proceeds to step 318 and the quantization codebook $\mathcal{Q}$ is determined. That is, when the quantization codebook $\mathcal{Q}$ converges after a number of iterations, the set of all $Q_k$ is the codebook. If the codebook has not converged, the method returns to step 310.

In actual implementation, this algorithm converges readily. Accordingly, the method 300 may be used in on-line (e.g., live, continuous transmission, etc.) applications. The method ends at step 318.

Figure 4:
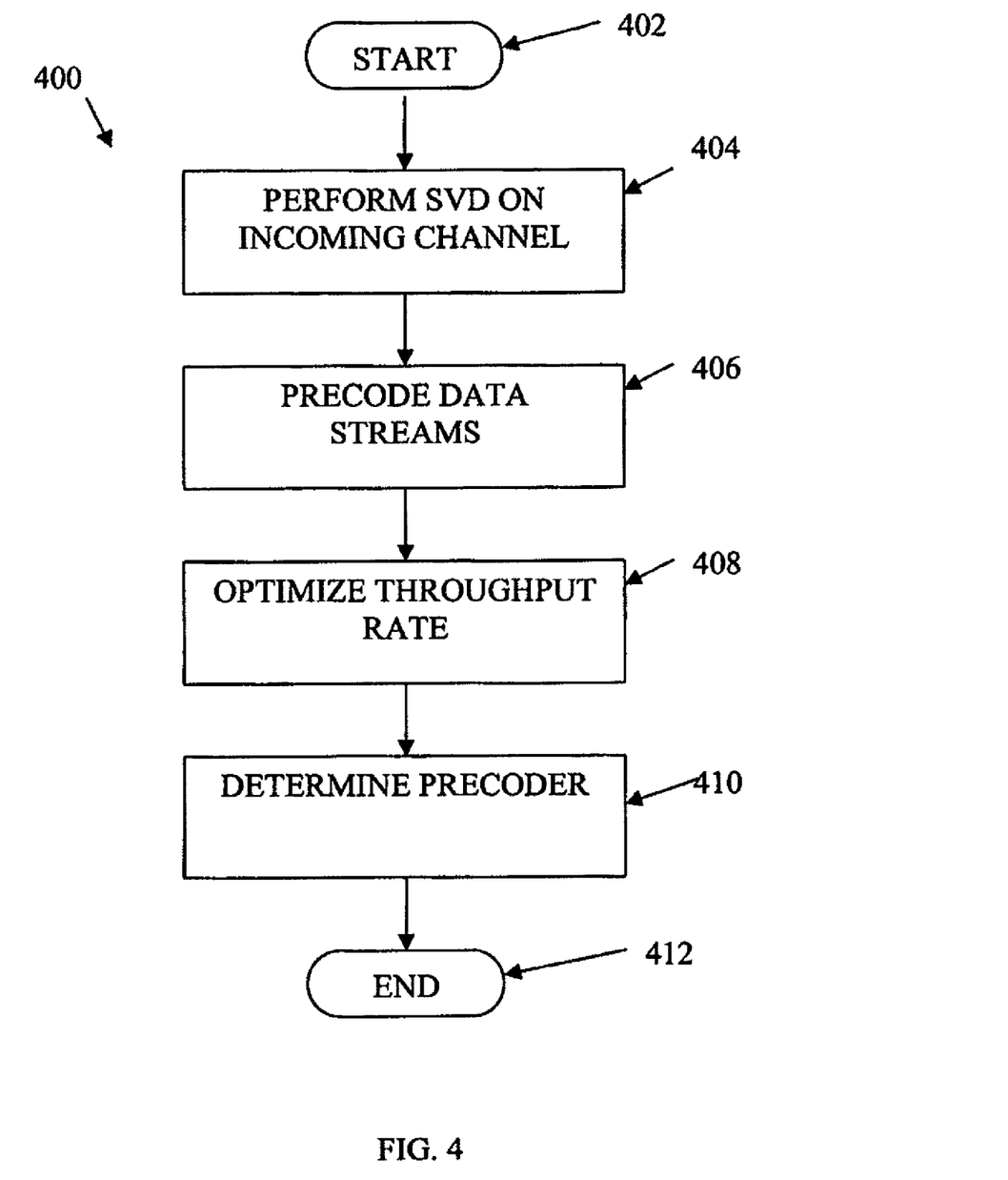
FIG. 4 is a flowchart of a method of designing a precoder according to an embodiment of the invention.

FIG. 4 is a flowchart of a method 400 of designing a precoding matrix and for precoding and transmission according to an embodiment of the invention. In some embodiments, the precoding matrix (alternatively referred to as the "precoder") may be stored on, designed by and/or implemented by precoder 112 of FIG. 1 and may be used, for precoding transmissions in network 100. In the same or alternative embodiments, the precoding matrix may be designed for transmission to multiple receivers 104a-104K based on quantized feedback in order to maximize the sum-rate. The method 400 begins at step 402.

In step 404, each receiver 106a-106K performs SVD on its incoming channel (e.g., $H_k = U_k D_k V_k^*$) and quantizes the dominant right eigenvectors $V_k(1:N)$. In step 406, the resultant indices are fed back to the base station 102 via feedback links 110a-110K. The scheduler 114 or another component (e.g., controller 500 of FIG. 5, etc.) may select L transmission streams as discussed above with respect to step 206 of method 200. $\hat{V} = [\hat{v}_1, \hat{v}_2, \ldots, \hat{v}_L]^T$ denotes the matrix of the quantized eigenvectors of the L scheduled receiver streams. In general, $\hat{v}_k$ corresponds to the $k^{th}$ receiver 106a-106K for which the channel matrix is given by $H_k$. In some embodiments, streams belonging to the same receiver are jointly detected. In this way, if $\hat{v}_i$ and $\hat{v}_j$ belong to the same receiver 106a-106K, $H_i = H_j$. At the transmitter (e.g., base station 102), each set of quantized indices restricts the set of channel conditions for the scheduled receivers to a Voronoi region: $D(\hat{V}) = \{(H^1, \ldots, H_L) : \|v_k - \hat{v}_k\| \leq \|v_k - q_j\|, \hat{v}_k, q_j \in Q, 1 \leq j \leq 2^B, \hat{v}_k \approx q_j, \text{ and } k=1, 2, \ldots, L\}$ and $d(v_k, \hat{v}_k) \leq d(v_k, q_j)$ where $d(.,.)$ is the distance (e.g., design) metric described above, $v_1, v_2, \ldots, v_L$ are the corresponding right eigenvectors of the channel matrices $H_1, H_2, \ldots, H_L$ to the quantized eigenvectors $\hat{v}_1, \hat{v}_2, \ldots, \hat{v}_L$, respectively, and $Q = \{q_1, q_2, \ldots, q_{2^B}\}$ is the quantization codebook as discussed above.

In step 406, the data streams are precoded. In some embodiments, L data streams $u_1, u_2, \ldots, u_L$ may be precoded by the M×L precoding matrix $G=[g_1, g_2, \ldots, g_L]$ with $g_i \in C^{M \times 1}$. The received signal by the $k^{th}$ receiver 106a-106K is $$y_k = H_k g_k u_k + \sum_{i=1, i \neq k}^{L} H_k g_i u_i + w_k.$$

By treating interference between receivers 106a-106K as noise, the rate of the $k^{th}$ stream is $$R_k(\hat{V}) = \log\left(1 + (H_k g_k) * \left[1 + \sum_{i=1, i \neq k}^{L} (H_k g_i)(H_k g_i)^*\right]^{-1} (H_k g_k)\right).$$

Channel knowledge at the base station 102 for each set of feedback indices defined by the set $H \in D(\hat{V})$ is a deterministic function of the channel state information at the receiver (CSIR), the sum rate throughput may be $$R_{sum} = \max_g \sum_{\hat{V}} Pr(H \in D(\hat{V})) E_{H \in D(\hat{V})}\left[\sum_{k=1}^{L} R_k(\hat{V})\right]$$

where optimization is taken over the set of precoding matrices $G=\{G(\hat{V}), \forall V\}$ for each Voronoi region.

The average power used by each precoder $G \in G$ may then be $E[|Gu|^2]=tr(GG^*)$ when $E[uu^*]=I$. Therefore, G is defined such that the total power constraint $\Sigma_{\hat{V}} Pr(H \in D(\hat{V})) tr(G(\hat{V})G(\hat{V})^*) \leq P$ is satisfied. In alternative embodiments, constant power may be used. In such cases, the power constraint may be $tr(G(\hat{V})G(\hat{V})^*) \leq P$.

In step 408, the rate may be optimized. That is, the optimization problem $R_{sum}$ may be solved. In some embodiments, the optimization may be solved separately for each Voronoi region. For a generic Voronoi region D and a precoder G, the optimization problem may be:

$$\max_G J = E_{H \in D}\left[\sum_{k=1}^{L} \log\left(1 + (H_k g_k) * \left[I + \sum_{i=1, i \neq k}^{L} (H_k g_i)(H_k g_i)^*\right]^{-1} (H_k g_k)\right)\right]$$

such that $tr(GG^*) \leq P$.

In some embodiments, a gradient descent search algorithm may be used to find the solution. The gradient of the objective function with respect to the precoder G may be determined analytically. The $(l,j)^{th}$ element of the objective function in such instances is $$\frac{\partial J}{\partial g_{lj}} =$$

$$E_{H \in D}\left[\frac{2}{A_l}(H_l g_l)^* \Sigma_l^{-1} h_j^{(l)} + \sum_{k=1, k \neq l}^{L} \frac{2}{A_k}(H_k g_k)^* \left[-\Sigma_k^{-1} h_j^{(k)}(H_k g_l) \Sigma_k^{-1}\right](H_k g_k)\right]$$

where $\Sigma_k = I + \Sigma_{i=1, i \neq k}^{L}(H_k g_i)(H_k g_i)^*$, $A_k = 1 + (H_k g_k)^* \Sigma_k^{-1} (H_k g_k)$, $h_j^{(k)}$ is the $j^{th}$ row if $H_k$ and $g_{lj}$ is the $j^{th}$ element of the column vector $g_l$. The objective function may then be expressed as $\nabla_G J = E_{H \in D}[H^* \psi^* A + H^* \psi^* \gamma A - H^* \psi^* A \psi H G]$ where $$A = \text{diag}\left(\frac{1}{A_1}, \frac{1}{A_2}, \ldots, \frac{1}{A_L}\right), H = [H_1^T H_2^T \ldots H_L^T]^T,$$

$\psi = \text{diag}(T_1, T_2, \ldots, T_L)$, $\gamma = \text{diag}(T_1 H_1 g_1, T_2 H_2 g_2, \ldots, T_2 H_L g_L)$, and $T_l = (H_l g_l)^* \Sigma_l^{-1}$, $1 \leq l \leq L$.

In step 410, the precoding matrix may be determined. In some embodiments, the precoder (precoding matrix) may be determined (e.g., the optimal G may be found) using a gradient descent algorithm as is known with the following recursion:

$$\tilde{G}^{k+1} = G^{(k)} - \mu_k \nabla_G J(G^{(k)}),$$

$$G^{(k+1)} = \frac{\sqrt{P} \tilde{G}^{(k+1)}}{\sqrt{tr(\tilde{G}^{(k+1)} \tilde{G}^{(k+1)*})}}$$

where $G^{(k)}$ is the precoding matrix after the $k^{th}$ iteration and $u_k$ is the step size parameter. Normalization with $$G^{(k+1)} = \frac{\sqrt{P} \tilde{G}^{(k+1)}}{\sqrt{tr(\tilde{G}^{(k+1)} \tilde{G}^{(k+1)*})}}$$

may be performed to satisfy the power constraint described above.

Step 410 may be initialized to an arbitrary semi-unitary matrix G that satisfies the power constraint $tr(GG^*) \leq P$. In the same or alternative embodiments, step 410 may be initially started at the solution to $$\tilde{G}^{(0)} = V^* \left[\hat{V} V^* + \frac{L}{P} I\right]^{-1}$$

which may facilitate faster convergence of the recursion.

In some embodiments, an alternative algorithm to the gradient descent algorithm may be used. For example, since the optimal solution satisfies $G = \mathbb{E}_{H \in D}[(H^* \psi^* A \psi H)^{-1} H^* \psi^* (I + \gamma) A]$, an alternative iterative algorithm may be used. In such an algorithm, at the $k^{th}$ step, G may be calculated using $G^{(k)}$ (e.g., the precoding matrix at the $k^{th}$ iteration) and $\tilde{G}^{(k+1)} \mathbb{E}_{H \in D}[(H^* \psi^* A \psi H)^{-1} H^* \psi^* (I + \gamma) A]|_{G^{(k)}}$. In this way, the new precoding matrix $G^{(k+1)}$ may be obtained after normalization. Other algorithms for determining the precoding matrix G may be used as appropriate.

The method ends at step 412.

In order to detect their streams, receivers 106a-106K have to know the precoder used by the transmitter (e.g., base station 102). This information is provided to the set of scheduled receivers 106a-106K through a reconfirmation process used by the base station 102. This reconfirmation is done either by sending a dedicated precoded pilot for each user or by retransmitting the index of the Voronoi region (e.g., the set of all scheduled user feedback indices). The size of precoding codebook is $2^{BL}$ for L streams and B bits of quantization of each eigenvector. Hence, although the precoding codebook can be obtained off-line based on a given quantization codebook, it might be practically not possible to store the precoding codebook because the size of the codebook could be very large. However, by implementing the same precoding method and the corresponding initialization as described above, the precoder may be computed on-line both at the base station 102 and at the receivers 106a-106K based on the quantization indices of the scheduled users.

The use of feedback may become undesirable at high SNR if a codebook with fixed size is employed since at high SNR a simple TDMA strategy without feedback will outperform a multi-user transmission strategy with imperfect CSIT. If the codebook size is fixed, transmission rank control may be employed by reducing the number of scheduled user streams as SNR increases. The sum-rate performance of such an adaptive transmission strategy is not limited at high SNR and is may improve performance over a TDMA strategy without CSIT and a multi-user precoding scheme with fixed transmission rank. The optimal transmission rank depends on the average SNR and can be computed off-line by using a simple greedy method.

Given the SNR, the precoder rank that results in the highest average sum-rate performance may be found. A precoder may be determined off-line as described above with respect to FIG. 4 for fixed transmission rank over different channel realizations. The rank that maximizes the average throughput performance may then be chosen. Therefore, in practical implementation a lookup table may be used with the available power and average SNR to determine the appropriate precoder rank that corresponds to the number of user streams to be selected by the scheduler 114.

FIG. 5 is a schematic drawing of a controller 500 according to an embodiment of the invention. Controller 500 may be used in conjunction with and/or may perform the functions of base station 102, precoder 112, and/or scheduler 114. In the same or alternative embodiments, controller 500 may reside at, be component of, and/or may be used by one or more receivers 106a-106K. That is, controller 500 may be adapted to perform functions of a transmitter and/or a receiver as is known.

Controller 500 contains a processor 502 which controls the overall operation of the controller 500 by executing computer program instructions which define such operation. The computer program instructions may be stored in a storage device 504 (e.g., magnetic disk, database, etc.) and loaded into memory 506 when execution of the computer program instructions is desired. Thus, applications for performing the herein-described method steps, such as precoding, codebook construction, transmitting and/or receiving data, and throughput optimization, in methods 200, 300, and 400 are defined by the computer program instructions stored in the memory 506 and/or storage 504 and controlled by the processor 502 executing the computer program instructions. The controller 500 may also include one or more network interfaces 508 for communicating with other devices via a network (e.g., a peer to peer network, etc.). The controller 500 also includes input/output devices 510 (e.g., display, keyboard, mouse, speakers, buttons, etc.) that enable user interaction with the controller 500. Controller 500 and/or processor 502 may include one or more central processing units, read only memory (ROM) devices and/or random access memory (RAM) devices. One skilled in the art will recognize that an implementation of an actual controller could contain other components as well, and that the controller of FIG. 5 is a high level representation of some of the components of such a controller for illustrative purposes.

According to some embodiments of the present invention, instructions of a program (e.g., controller software) may be read into memory 506, such as from a ROM device to a RAM device or from a LAN adapter to a RAM device. Execution of sequences of the instructions in the program may cause the controller 500 to perform one or more of the method steps described herein, such as those described above with respect to methods 200, 300, and 400. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 506 may store the software for the controller 500, which may be adapted to execute the software program and thereby operate in accordance with the present invention and particularly in accordance with the methods described in detail above. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system, and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method implemented in a base station used for a downlink multi-user (MU) multi-input multi-output (MIMO) system, comprising:
    receiving an indication of a quantized vector from each of a plurality of user equipments;
    determining the precoder;
    precoding data streams for the plurality of user equipments; and
    transmitting the precoded data to the plurality of user equipments,
    wherein the precoded data is expressed by equation $x = Gu$ where x is the precoded data, u denotes the data streams, G is a precoder comprising matrix $[\hat{v}_1, \hat{v}_2, \ldots, \hat{v}_L]$, and $\hat{v}_1, \hat{v}_2, \ldots,$ and $\hat{v}_L$ are indicated by the plurality of user equipments,
    wherein the number of the data streams is equal to or greater than the number of the user equipments, and
    wherein determining the precoder comprises:

(a) initializing initial precoder $\tilde{G}^{(0)}$ as $$\hat{V}^*\left[\hat{V}\hat{V}^* + \frac{L}{P}I\right]^{-1},$$

where $\hat{V}=[\hat{v}_1, \hat{v}_2, \ldots, \hat{v}_L]^T$, P is average power, L is the number of the data streams, and I is an identity matrix;

(b) determining $k^{th}$ precoder $$G^{(k)} = \frac{\sqrt{P}\,\tilde{G}^{(k)}}{\sqrt{tr\left(\tilde{G}^{(k)}\tilde{G}^{(k)*}\right)}}$$

at a $k^{th}$ iteration;

(c) determining $(k+1)^{th}$ precoder $\tilde{G}^{(k+1)}$ as $E_{\epsilon D}\lfloor (H^*\psi^*A\psi H)^{-1}H^*\psi^*(I+\gamma)A\rfloor|_{G^{(k)}}$, where H is a channel matrix of transmission channels to the plurality of user equipments, E denotes the expectation operation, D is the set of channel over which the expectation is taken, $$A = diag\left(\frac{1}{A_1}, \frac{1}{A_2}, \ldots \frac{1}{A_L}\right),\ H = [H_1^T H_2^T \ldots H_L^T]^T,$$

$\psi = diag(T_1, T_2, \ldots, T_L)$, $\gamma = diag(T_1H_1g_1, T_2H_2g_2, \ldots T_LH_Lg_L)$, $g_l$ is the $l^{th}$ column of the precoder G, $$A_l = 1 + (H_lg_l)^*\Omega_l^{-1}(H_lg_l),\ \Omega_l^{-1} = I + \sum_{i=1, i\neq l}^{L}(H_lg_i)(H_lg_i)^*,$$

$T_l = (H_lg_l)^*\Omega_l^{-1}$, and $1 \leq l \leq L$; and (d) performing (b) and (c) for a specific number of iteration, where the specific number of iteration $\geq 0$.

2. A base station used for a downlink multi-user (MU) multi-input multi-output (MIMO) system, comprising:
a receiving unit to receive an indication of a quantized vector from each of a plurality of user equipments;
a control unit to determine the precoder;
a precoding unit to precode data streams for the plurality of user equipments; and
a transmission unit to transmit the precoded data to the plurality of user equipments,
wherein the precoded data is expressed by equation $x=Gu$ where x is the precoded data, u denotes the data streams, G is a precoder comprising matrix $[\hat{v}_1, \hat{v}_2, \ldots, \hat{v}_L]$, and $\hat{v}_1, \hat{v}_2, \ldots,$ and $\hat{v}_L$ are indicated by the plurality of user equipments,
wherein the number of the data streams is equal to or greater than the number of the user equipments, and
wherein the control unit performs:
(a) initializing initial precoder $\tilde{G}^{(0)}$ as $\hat{V}^*\left[\hat{V}\hat{V}^* + \frac{L}{P}I\right]^{-1}$, where $\hat{V}=[\hat{v}_1, \hat{v}_2, \ldots, \hat{v}_L]^T$, $\hat{v}_i$ being the quantized vector corresponding to the $i^{th}$ user equipment, P is average power, L is the number of the data streams, and I is an identity matrix;

(b) determining $k^{th}$ precoder $$G^{(k)} = \frac{\sqrt{P}\,\tilde{G}^{(k)}}{\sqrt{tr\left(\tilde{G}^{(k)}\tilde{G}^{(k)*}\right)}}$$

at a $k^{th}$ iteration;

(c) determining $(k+1)^{th}$ precoder $\tilde{G}^{(k+1)}$ as $E_{H\epsilon D}\lfloor (H^*\psi^*A\psi H)^{-1}H^*\psi^*(I+\gamma)A\rfloor|_{G^{(k)}}$, where H is a channel matrix of transmission channels to the plurality of user equipments, E denotes the expectation operation, D is the set of channel over which the expectation is taken, $A = diag\left(\frac{1}{A_1}, \frac{1}{A_2}, \ldots \frac{1}{A_L}\right)$, $H = [H_1^T H_2^T \ldots H_L^T]^T$, $\psi = diag(T_1, T_2, \ldots, T_L)$, $\gamma = diag(T_1H_1g_1, T_2H_2g_2, \ldots T_LH_Lg_L)$, $g_l$ is the $l^{th}$ column of the precoder G, $$A_l = 1 + (H_lg_l)^*\Omega_l^{-1}(H_lg_l),\ \Omega_l^{-1} = I + \sum_{i=1, i\neq l}^{L}(H_lg_i)(H_lg_i)^*,$$

$T_l = (H_lg_l)^*\Omega_l^{-1}$, and $1 \leq l \leq L$; and (d) performing (b) and (c) for a specific number of iteration, where the specific number of iteration $\geq 0$.

3. A method implemented in a user equipment used for a downlink multi-user (MU) multi-input multi-output (MIMO) system, comprising:
transmitting an indication of a quantized vector to a base station; and
receiving data precoded with a precoder from the base station,
wherein the precoded data is precoded from data streams for a plurality of user equipments,
wherein the precoded data is expressed by equation $x=Gu$ where x is the precoded data, u denotes the data streams, G is a precoder comprising matrix $[\hat{v}_1, \hat{v}_2, \ldots, \hat{v}_L]$, and $\hat{v}_1, \hat{v}_2, \ldots,$ and $\hat{v}_L$ are indicated by the plurality of user equipments,
wherein the number of the data streams is equal to or greater than the number of the user equipments, and
wherein the precoder is determined by:
(a) initializing initial precoder $\tilde{G}^{(0)}$ as $\hat{V}^*\left[\hat{V}\hat{V}^* + \frac{L}{P}I\right]^{-1}$, where $\hat{V}=[\hat{v}_1, \hat{v}_2, \ldots, \hat{v}_L]^T$, P is average power, L is the number of the data streams, and I is an identity matrix;

(b) determining $k^{th}$ precoder $$G^{(k)} = \frac{\sqrt{P}\,\tilde{G}^{(k)}}{\sqrt{tr(\tilde{G}^{(k)}\tilde{G}^{(k)*})}}$$

at a $k^{th}$ iteration;

(c) determining (k+1 precoder $\tilde{G}^{(k+1)}$ as $E_{H \epsilon D} \lfloor (H^* \psi^* A \psi H)^{-1} H^* \psi^* (I+\gamma) A \rfloor |_{G^{(k)}}$, where H is a channel matrix of transmission channels to the plurality of user equipments, E denotes the expectation operation, D is the set of channel over which the expectation is taken, $$A = diag\left(\frac{1}{A_1}, \frac{1}{A_2}, \ldots \frac{1}{A_L}\right),$$

$$H = [H_1^T H_2^T \ldots H_L^T]^T, \psi = diag(T_1, T_2, \ldots, T_L),$$

$\gamma = diag(T_1 H_1 g_1, T_2 H_2 g_2, \ldots T_L H_L g_L)$, $g_l$ is the $l^{th}$ column of the precoder G, $$A_l = 1 + (H_l g_l)^* \Omega_l^{-1} (H_l g_l), \Omega_l^{-1} = I + \sum_{i=1, i \neq l}^{L} (H_l g_i)(H_l g_i)^*,$$

$$T_l = (H_l g_l)^* \Omega_l^{-1}, \text{ and } 1 \leq l \leq L; \text{ and}$$

(d) performing (b) and (c) for a specific number of iteration, where the specific number of iteration $\geq 0$.

* * * * *